US011902189B2

United States Patent
Liu

(10) Patent No.: US 11,902,189 B2
(45) Date of Patent: *Feb. 13, 2024

(54) METHOD AND APPARATUS FOR ENABLING CONCURRENT TRANSPORT VIA CONTROL PLANE

(71) Applicant: NOKIA TECHNOLOGIES OY, Espoo (FI)

(72) Inventor: Jennifer J-N. Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,564

(22) Filed: Jan. 9, 2023

(65) Prior Publication Data
US 2023/0163905 A1    May 25, 2023

Related U.S. Application Data

(63) Continuation of application No. 16/696,544, filed on Nov. 26, 2019, now Pat. No. 11,563,536.

(60) Provisional application No. 62/774,113, filed on Nov. 30, 2018.

(51) Int. Cl.
| | |
|---|---|
| *H04L 5/00* | (2006.01) |
| *H04W 76/25* | (2018.01) |
| *H04W 48/18* | (2009.01) |
| *H04W 80/10* | (2009.01) |
| *H04W 8/08* | (2009.01) |

(52) U.S. Cl.
CPC ............ *H04L 5/0044* (2013.01); *H04W 8/08* (2013.01); *H04W 48/18* (2013.01); *H04W 76/25* (2018.02); *H04W 80/10* (2013.01)

(58) Field of Classification Search
None
See application file for complete search history.

(56) References Cited

U.S. PATENT DOCUMENTS

| | | | |
|---|---|---|---|
| 10,624,020 B2 * | 4/2020 | Abraham | H04W 40/02 |
| 10,764,951 B2 * | 9/2020 | Park | H04W 12/06 |
| 11,419,006 B2 * | 8/2022 | Liu | H04W 28/06 |
| 11,563,536 B2 * | 1/2023 | Liu | H04W 8/08 |

(Continued)

OTHER PUBLICATIONS

3GPP TS 23.122 V8.2.0 (Release 8), 3rd Generation Partnership Project; Technical Specification Group Core Network and Terminals; Non-Access-Stratum (NAS) Functions Related to Mobile Station (MS) In Idle Mode (Jun. 2008) 35 pages.

(Continued)

*Primary Examiner* — Faiyazkhan Ghafoerkhan
(74) *Attorney, Agent, or Firm* — ALSTON & BIRD LLP

(57) ABSTRACT

A method includes generating a payload container information element comprising two or more payload entries at user equipment in a communication system, and sending the payload container information element from the user equipment to at least one network element in the communication system. Another method includes receiving a payload container information element comprising two or more payload entries at a network function in a communication system from user equipment in the communication system, and decoding the two or more payload entries of the payload container information element into two or more individual payloads at the network function.

20 Claims, 11 Drawing Sheets

(56) References Cited

U.S. PATENT DOCUMENTS

| | | | | |
|---|---|---|---|---|
| 2005/0147040 | A1* | 7/2005 | Vayanos | H04L 1/0041 370/278 |
| 2008/0076411 | A1* | 3/2008 | Khetawat | H04W 24/02 455/432.1 |
| 2008/0076412 | A1* | 3/2008 | Khetawat | H04W 24/02 455/432.1 |
| 2013/0080597 | A1* | 3/2013 | Liao | H04L 5/0001 709/219 |
| 2013/0083726 | A1* | 4/2013 | Jain | H04W 4/70 370/328 |
| 2015/0163695 | A1* | 6/2015 | Li | H04L 1/0091 370/328 |
| 2015/0349927 | A1* | 12/2015 | Cohn | H04L 1/0083 714/748 |
| 2016/0007390 | A1* | 1/2016 | Starsinic | H04W 4/20 370/328 |
| 2016/0337781 | A1* | 11/2016 | Jain | H04W 88/16 |
| 2017/0150332 | A1* | 5/2017 | Palanisamy | H04W 4/70 |
| 2018/0139762 | A1* | 5/2018 | Cho | H04W 4/90 |
| 2018/0227826 | A1* | 8/2018 | Abraham | H04W 40/248 |
| 2018/0270873 | A1* | 9/2018 | Cho | H04W 72/0446 |
| 2018/0324671 | A1* | 11/2018 | Palnati | H04L 12/1407 |
| 2018/0367965 | A1* | 12/2018 | Palanisamy | H04W 4/14 |
| 2019/0028925 | A1* | 1/2019 | Chun | H04W 28/04 |
| 2019/0029065 | A1* | 1/2019 | Park | H04W 48/02 |
| 2019/0349340 | A1* | 11/2019 | Zhang | H04L 63/20 |
| 2020/0015311 | A1* | 1/2020 | Kim | H04W 68/005 |
| 2020/0177333 | A1* | 6/2020 | Liu | H04W 8/08 |
| 2020/0245222 | A1* | 7/2020 | Abraham | H04W 40/02 |
| 2021/0037415 | A1* | 2/2021 | Liu | H04W 28/06 |
| 2023/0163905 | A1* | 5/2023 | Liu | H04W 76/25 370/329 |

OTHER PUBLICATIONS

3GPP TS 23.501 V15.2.0 (Release 15), 5G; System Architecture for the 5G System (Jun. 2018) 219 pages.

3GPP TS 24.501 V15.0.0 (Release 15) 5G; Non-Access-Stratum (NAS)Protocol for 5G System (5GS); Stage 3 (Jul. 2018) 337 pages.

3GPP TS 33.501 V15.1.0 (Release 15) 5G; Security Architecture and Procedures for 5G System (Jul. 2018) 150 pages.

Non-Final Office Action for U.S. Appl. No. 16/696,544 dated Apr. 13, 2022.

Non-Final Office Action for U.S. Appl. No. 16/696,544 dated Jun. 25, 2021.

Notice of Allowance for U.S. Appl. No. 16/696,544 dated Sep. 21, 2022.

Support Ending Multiple Payloads Via Payload Container, C1-188519, 3GPP TSG-CT WG1 Meeting #113 (Nov. 2018) 15 pages.

* cited by examiner

METHOD AND APPARATUS FOR ENABLING CONCURRENT TRANSPORT VIA CONTROL PLANE

CROSS-REFERENCE TO RELATED APPLICATION

This application is a Continuation of U.S. application Ser. No. 16/696,544, filed Nov. 26, 2019, which claims priority to U.S. Provisional Application No. 62/774,113, filed Nov. 30, 2018, the entire contents of which are incorporated herein by reference.

FIELD

The field relates generally to communication systems, and more particularly, but not exclusively, to data transport within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.2.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.1.0, entitled "Technical Specification Group Services and System Aspects; Security Architecture and Procedures for the 5G System" and 5G Technical Report (TR) 33.899, V1.3.0, entitled Technical Specification Group Services and System Aspects; Study on the Security Aspects of the Next Generation System," the disclosures of which are incorporated by reference herein in their entireties, further describe security management details associated with a 5G network.

Security management is an important consideration in any communication system. For example, protections in a 5G network against false bases stations, e.g., communication equipment or devices, operated by malicious actors, pretending to be legitimate base stations in a serving network, are critical to prevent such malicious actors from acquiring sensitive subscriber information that would allow them to, inter alia, act like a legitimate UE to the 5G network.

SUMMARY

Illustrative embodiments provide improved techniques for data transport in communication systems particularly with respect to enabling concurrent transport via the control plane.

For example, in one illustrative embodiment, a method comprises the following steps. A payload container information element comprising two or more payload entries is generated at user equipment in a communication system. The payload container information element is sent from the user equipment to at least one network element in the communication system. The user equipment is implemented via at least one processor coupled to a memory.

In another illustrative embodiment, a method comprises the following steps. A payload container information element comprising two or more payload entries is received at a network function in a communication system from user equipment in the communication system. The two or more payload entries of the payload container information element are decoded into two or more individual payloads at the network function. The network element is implemented via at least one processor coupled to a memory.

In another illustrative embodiment, a method comprises the following steps. A payload container information element comprising two or more payload entries is generated at a network element in a communication system. The payload container information element is sent from the network element to user equipment in the communication system. The network element is implemented via at least one processor coupled to a memory.

In another illustrative embodiment, a method comprises the following steps. A payload container information element comprising two or more payload entries is received at user equipment in a communication system from a network element in the communication system. The two or more payload entries of the payload container information element is decoded into two or more individual payloads at the user equipment. The user equipment is implemented via at least one processor coupled to a memory.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Figure 1:
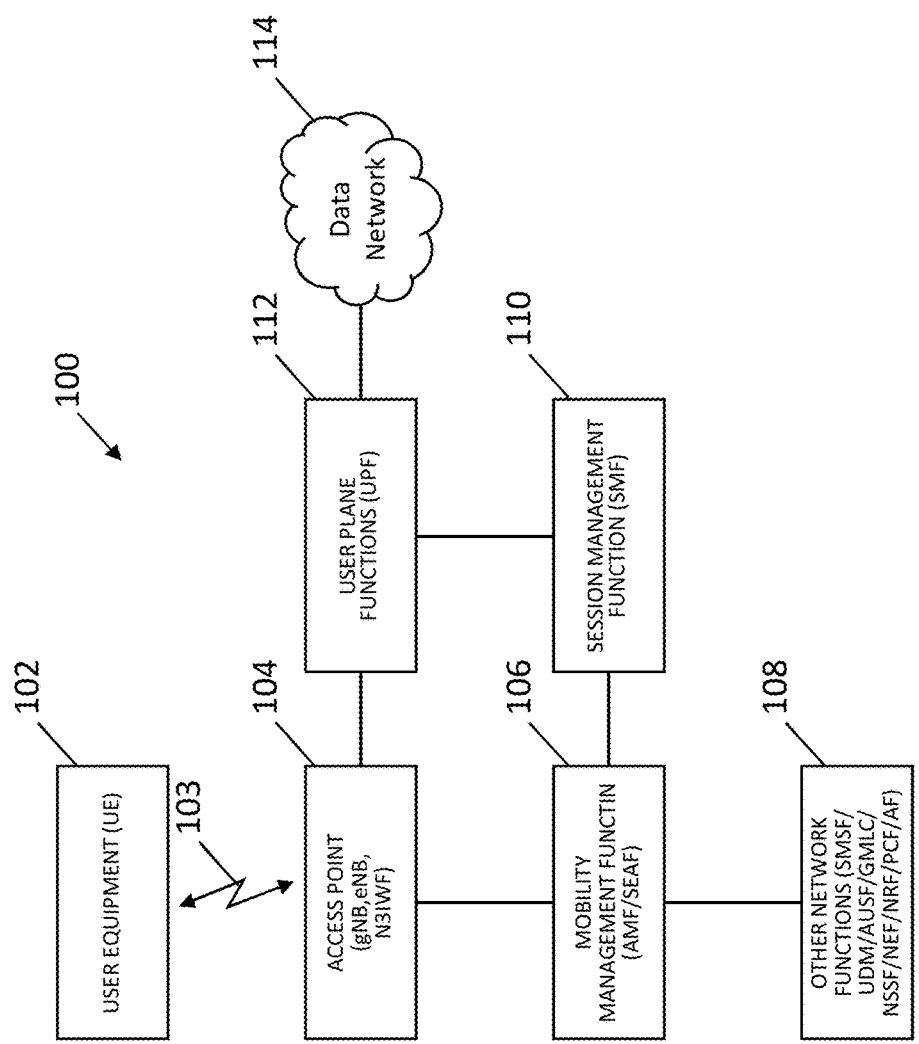
FIG. 1 illustrates a communication system with which one or more illustrative embodiments are implemented.

Embodiments will be illustrated herein in conjunction with example communication systems and associated techniques for providing data transport in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3$^{rd}$ Generation Partnership Project (3GPP) system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501, 3GPP TS 33.501, and 3GPP TR 33.899. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (e.g. gNB, eNB or N3IWF) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and/or a device that executes ultra-reliable low latency communication (URLLC) application software where computing resources on the UE are limited or performance and timing requirements are very stringent. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF provides transport for messages between the UE and other network functions, such as forwarding session management (SM) messages between the UE and a session management function (SMF), short message service (SMS) messages between the UE and the SMS function (SMSF), Location Services messages between the UE and the location management function (LMF) as well as between a radio access network (RAN) and the LMF, etc. The AMF is also referred to herein, more generally, as an access and mobility management entity.

The AMF 106 in this illustrative embodiment is operatively coupled to the Session Management Function (SMF) 110. The Session Management Function provides the essential function for packet data session management which enables the user equipment to connect to a data network using one of the supported session types, e.g. IPv4, IPv6, IPv4v6, Ethernet, Unstructured, etc. The SMF enables termination of session management parts of NAS messages, provides key functionalities for session establishment, modification and release, including tunnel maintenance between the user plane function (UPF) and the access network (AN) node. The SMF also enables termination of interfaces towards Policy control functions and provides the interface to support transporting user data via the control plane to enable Control Plane cellular internet of things (CIoT) 5G system (5GS) optimization feature for internet of things (IoT) devices.

The AMF 106 in this illustrative embodiment is operatively coupled to other network functions 108, which can include home subscriber functions, i.e., one or more functions that are resident in the home network of the subscriber. As shown, some of these functions include the Unified Data Management (UDM) function, as well as an Authentication Server Function (AUSF). Other network functions include, but are not limited to, SMS Function (SMSF), Location Management Function (LMF), Gateway Mobile Location Centre (GMLC), Network Slice Selection Function (NSSF), Network Exposure Function (NEF), Network Repository Function (NRF), Policy Control Function (PCF), Over-the-Air Function (OTAF), Steering of roaming Application Function (SoR-AF) and Application Function (AF).

One important point to note is that in an SBA communication system, such as a 5G system, the control plane uses a services model approach in which components (NFs) query the NRF to discover and communicate with each other over application programming interfaces (APIs). The NF services discovery and authorization method will be described in further detail below.

The access point 104 is also operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of Protocol Data Unit (PDU) sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via access point 104 (e.g. gNB). NFs can also access services of other NFs.

Figure 2:
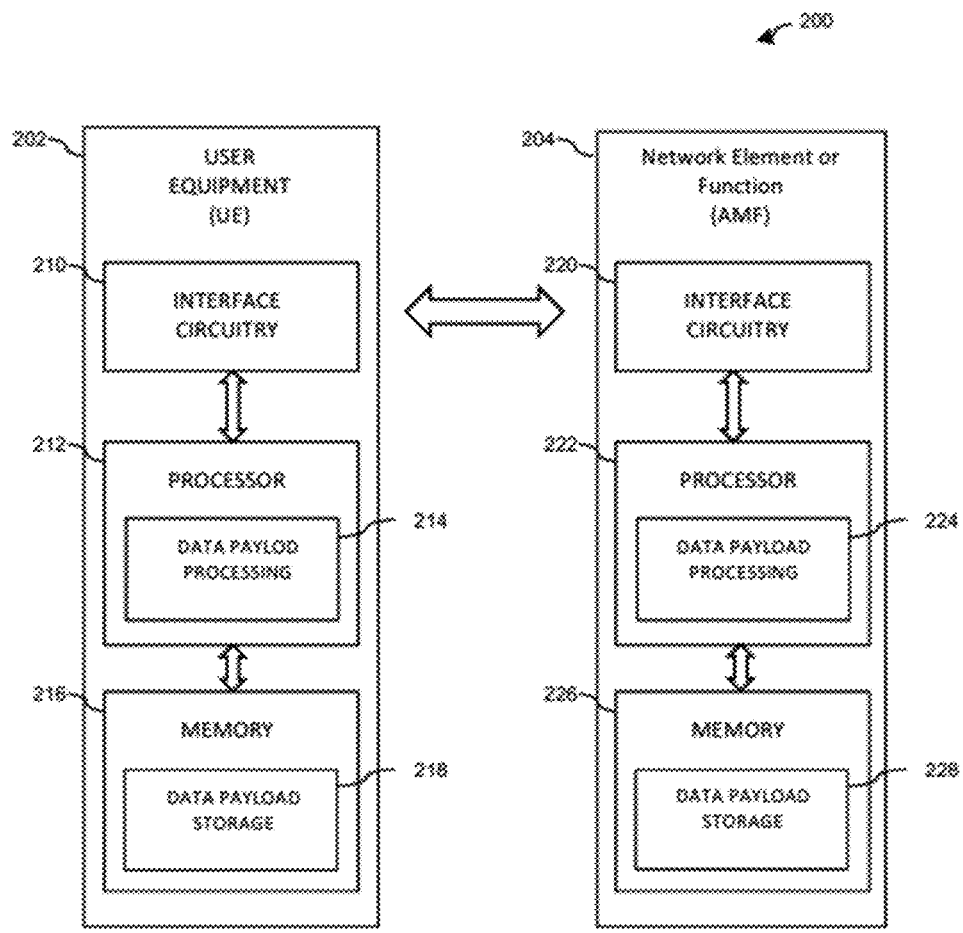
FIG. 2 illustrates user equipment and a base station configured for providing data transport management with which one or more illustrative embodiments are implemented.

FIG. 2 is a block diagram of user equipment and a network element or function configured for providing data transport management in an illustrative embodiment. More particularly, system 200 is shown comprising user equipment 202 and a network element or function 204. In some embodiments the network element or function 204 represents an AMF.

The user equipment 202 comprises a processor 212 coupled to a memory 216 and interface circuitry 210. The processor 212 of the user equipment 202 includes a data payload processing module 214 that may be implemented at least in part in the form of software executed by the processor. The processing module 214 performs data payload or more generally data transport management described below and elsewhere herein. The memory 216 of the user equipment 202 includes a data payload storage module 218 that stores data generated or otherwise used during data payload management operations.

The network element or function 204 comprises a processor 222 coupled to a memory 226 and interface circuitry 220. The processor 222 of the network element or function 204 includes a data payload processing module 224 that may be implemented at least in part in the form of software executed by the processor 222. The processing module 224 performs data payload or more generally data transport management described below and elsewhere herein. The memory 226 of the network element or function 204 includes a data payload storage module 228 that stores data generated or otherwise used during data payload management operations.

The respective processors 212 and 222 of the user equipment 202 and the network element or function 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The respective memories 216 and 226 of the user equipment 202 and the network element or function 204 may be used to store one or more software programs that are executed by the respective processors 212 and 222 to implement at least a portion of the functionality described herein. For example, data transport management operations and other functionality as described below and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The respective interface circuitries 210 and 220 of the user equipment 202 and the network element or function 204 illustratively comprise transceivers or other communication hardware or firmware that allows the associated system elements to communicate with one another in the manner described herein.

It is apparent from FIG. 2 that the user equipment 202 is configured for communication with the network element or function 204 and vice-versa via their respective interface circuitries 210 and 220. This communication involves user equipment 202 sending data to the network element or function 204, and the network element or function 204 sending data to user equipment 202. However, in alternative embodiments, other network elements may be operatively coupled between, as well as to, the user equipment 202 and the network element or function 204. The term "data" as used herein is intended to be construed broadly, so as to encompass any type of information that may be sent between user equipment and a base station including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, user equipment and network elements or functions can be configured to incorporate additional or alternative components and to support other communication protocols.

Other elements in a 5G network may each also be configured to include components such as a processor, memory and network interface. These elements need not be implemented on separate stand-alone processing platforms, but could instead, for example, represent different functional portions of a single common processing platform.

Illustrative embodiments provide mechanisms to enable sending and receiving multiple payload in the same payload container.

Non-Access Stratum (NAS) Transport Procedures

1. General

The purpose of the NAS transport procedures is to provide a transport of one or multiple payloads between the UE and the AMF. The type of the payload is identified by the Payload container type information element (IE) and includes one of the following:
    a) a single 5GSM message;
    b) short message service (SMS);
    c) an LTE Positioning Protocol (LPP) message;
    d) a steering of roaming transparent container including steering of roaming information;
    e) a UE policy container including UE policy information;
    f) a UE parameters update transparent container including UE parameters;
    g) a location services message; or
    x) Multiple payloads.

Other types of payloads include a session management message and CIoT user data. For these as well as payload types a) to g), along with the payload, the NAS transport procedure may transport the associated information (e.g. Protocol Data Unit (PDU) session information for 5G System (5GS) session management (5GSM) message payload).

Figure 1A:
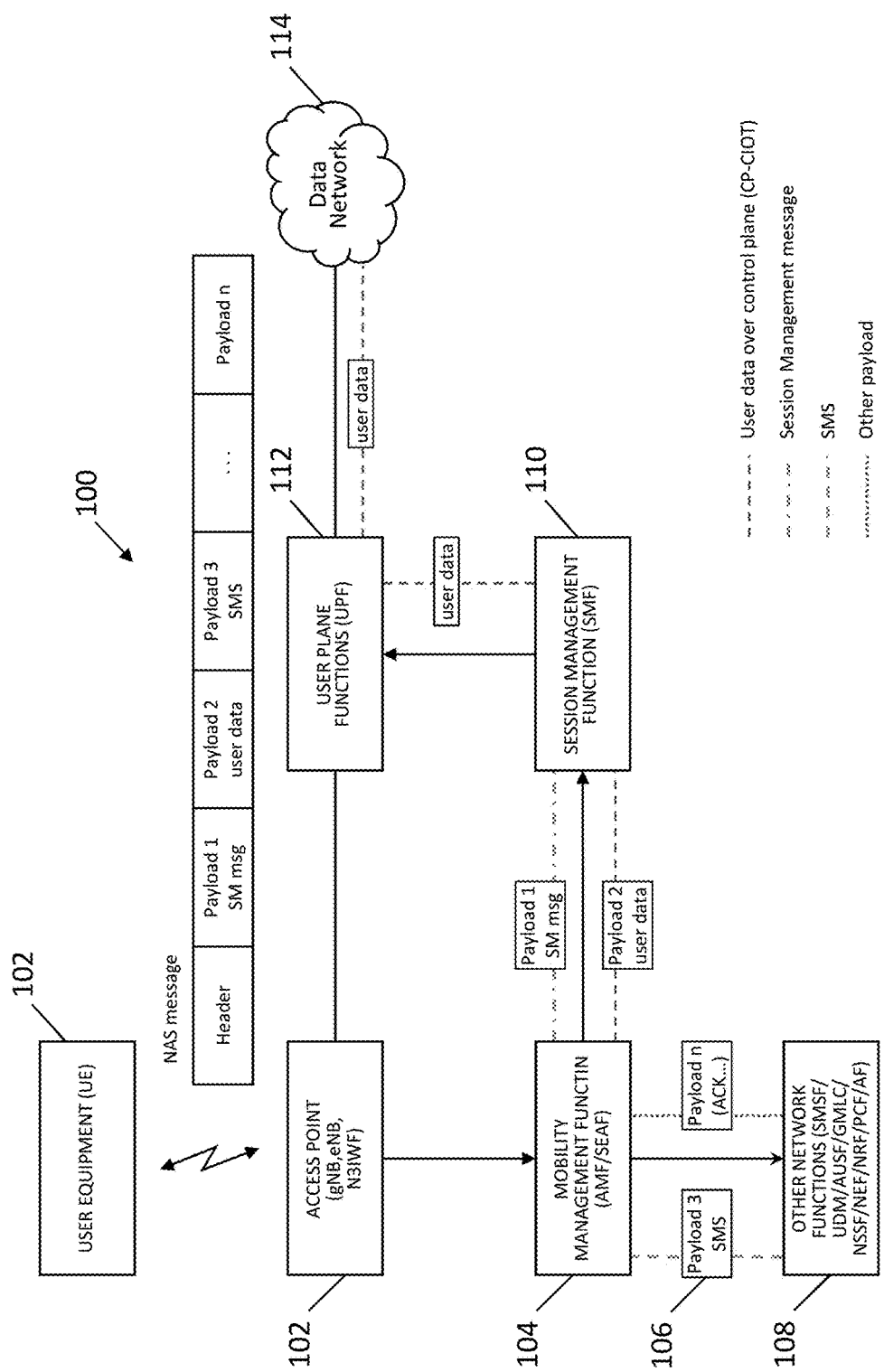
FIG. 1a illustrates a non-access stratum (NAS) message with multiple payloads destined towards different network functions that is generated by user equipment and sent to the network.
Figure 6:
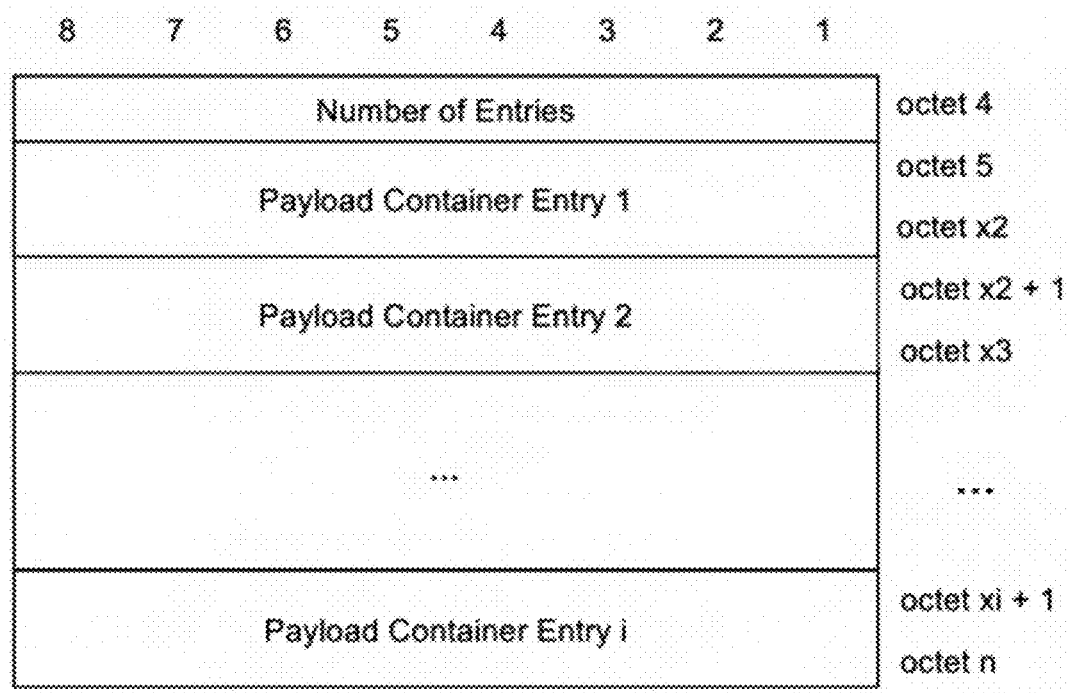
FIG. 6 illustrates a payload container information element with a payload container type specifying multiple payloads in an illustrative embodiment.

For payload type x), the Payload container IE consists a list of payload container entries according to FIG. 6, where each payload container entry contains the payload and optional associated information (e.g. PDU session information for 5GSM message payload). Reference is also made to FIG. 1a which depicts a NAS message having a header and multiple payloads, namely, payload 1 in the form of a SM message, payload 2 in the form of user data, payload 3 in the form of an SMS message, . . . payload n. As shown in FIG. 1a, the multiple payloads are generated by the UE and directed over the network to different functions, namely, the transport of the user data over the control plane to the data network, the session management message to the SMF, the SMS message to the SMSF and other payloads to other network functions.

2. UE-Initiated NAS Transport Procedure

A. General

The purpose of the UE-initiated NAS transport procedure is to provide a transport of:
a) a single 5GSM message;
b) SMS;
c) an LTE Positioning Protocol (LPP) message;
d) a steering of roaming (SOR) transparent container including SOR information;
e) a UE policy container including UE policy information;
f) a UE parameters update transparent container including UE parameters;
g) a location services message; or
x) multiple of the above types; and:
 for a) to g), optional associated payload routing information from the UE to the AMF in a 5GMM message; and
 for x), the Payload container IE consists of a list of payload container entries according to FIG. 6, where each of the payload container entries contains the payload and optional associated information (e.g. PDU session information for 5GSM message payload). Other types of messages for which the UE-initiated transport procedure provides for transport include a session management message and CIoT user data.

B. UE-Initiated NAS Transport Procedure Initiation

Figure 3:
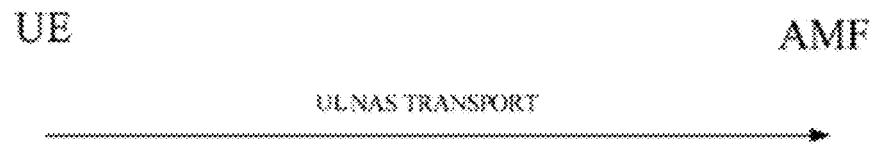
FIG. 3 illustrates a user equipment-initiated transport procedure in an illustrative embodiment.

In the connected mode, the UE initiates the NAS transport procedure by sending the UL NAS TRANSPORT message, as shown in FIG. 3.

In case a) in section 2A, the UE shall:
a) include the session information specific to the payload (PDU session ID, old PDU session ID, specific network slice selection assistance information (S-NSSAI), mapped configured S-NSSAI from the configured NSSAI for the home public land mobile network (HPLMN) (if available in roaming scenarios), data network name (DNN), request type, e.g., session management message request type, etc.), if available:
b) set the Payload container type IE to "N1 SM information"; and
c) set the Payload container IE to the 5GSM message.

The UE shall set the PDU session ID IE to the PDU session ID. If an old PDU session ID is to be included, the UE shall set the Old PDU session ID IE to the old PDU session ID.

If an S-NSSAI is to be included, the UE shall set the S-NSSAI IE to the S-NSSAI selected for the PDU session from the allowed NSSAI for the serving PLMN, associated with the mapped configured NSSAI for the HPLMN (if available in roaming scenarios).

If a DNN is to be included, the UE shall set the DNN IE to the DNN.

If a request type is to be included, the UE shall set the Request type IE to the request type. The request type is not provided along with 5GSM messages other than the PDU SESSION ESTABLISHMENT REQUEST message and the PDU SESSION MODIFICATION REQUEST message.

In an instance in which the UE sends the UL NAS TRANSPORT message to the AMF (see example in FIG. 3) and in case b) in section 2A, the UE shall:
set the Payload container type IE to "SMS"; and
set the Payload container IE to the SMS payload.

Based on the UE preferences regarding access selection for mobile originated (MO) transmission of SMS over NAS:
a) when SMS over NAS is preferred to be sent over 3GPP access: the UE attempts to deliver MO SMS over NAS via the 3GPP access if the UE is registered over both 3GPP access and non-3GPP access. If the delivery of SMS over NAS via the 3GPP access is not available, the UE attempts to deliver MO SMS over NAS via the non-3GPP access; and
b) when SMS over NAS is preferred to be sent over non-3GPP access: the UE attempts to deliver MO SMS over NAS via the non-3GPP access if the UE is registered over both 3GPP access and non-3GPP access. If the delivery of SMS over NAS via the non-3GPP access is not available, the UE attempts to deliver MO SMS over NAS via the 3GPP access.

In case c) in section 2A, the UE shall:
set the Payload container type IE to "LTE Positioning Protocol (LPP) message container";
set the Payload container IE to the LPP message payload; and
set the Additional information IE to the routing information provided by the upper layer location services application.

In case d) in section 2A, the UE shall:
set the Payload container type IE to "SOR transparent container"; and
set the Payload container IE to the UE acknowledgement due to successful reception of steering of roaming information.

In case e) in section 2A, the UE shall:
set the Payload container type IE to "UE policy container"; and
set the contents of the Payload container IE.

Figure 7:
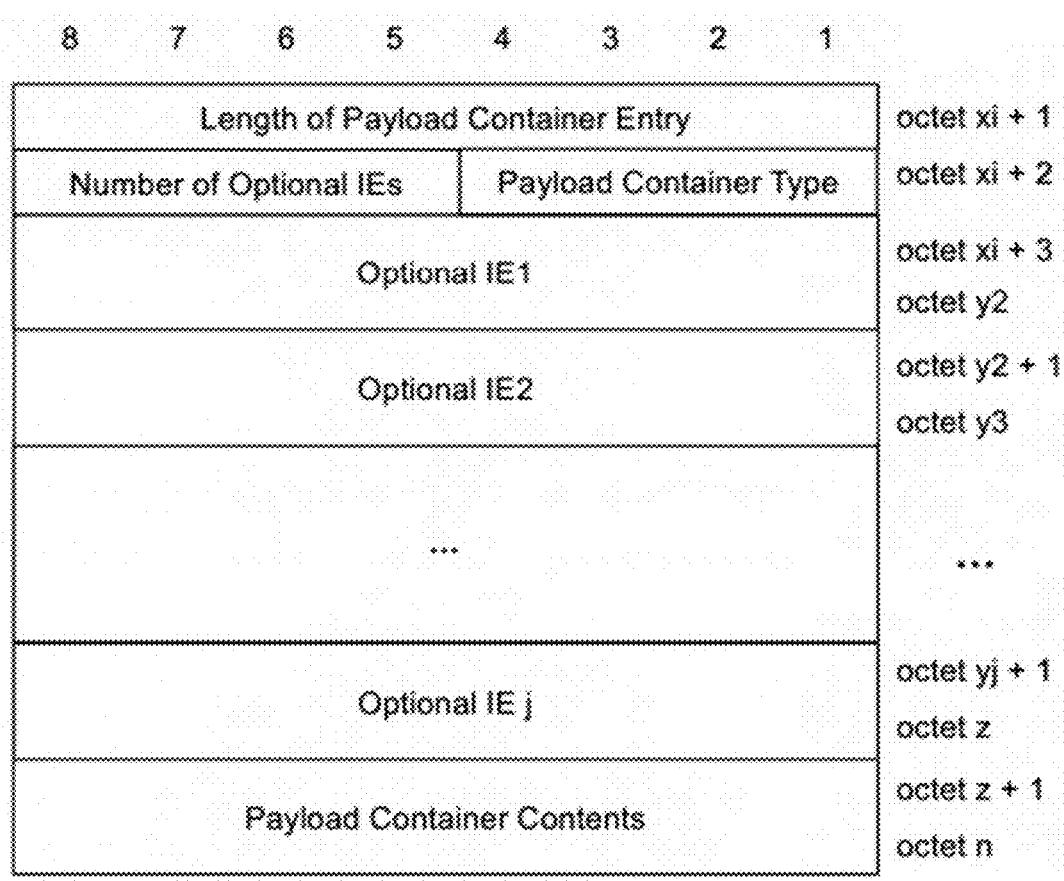
FIG. 7 illustrate a payload container entry in an illustrative embodiment.
Figure 8:
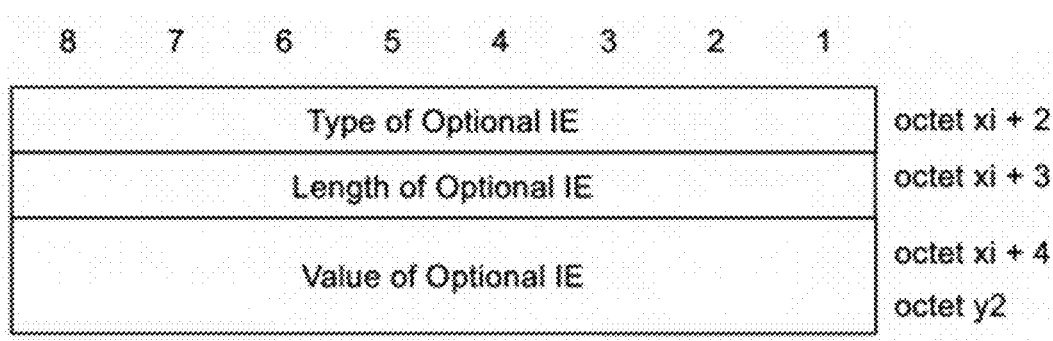
FIG. 8 illustrates an optional information element entry in an illustrative embodiment.

In case x) in section 2A, the UE shall:
set the Payload container type IE to "Multiple payloads"; and
set the contents of the Payload container IE as specified in FIGS. 6-8. For each payload container entry, the UE shall:
 i) include the optional IEs in the payload container entry along with payload container IE as shown in FIG. 7 according to the following inclusion conditions and the UE:
  shall include PDU session ID IE when the Payload container type field of the payload container entry is set to "N1 SM information";
  shall include Old PDU session ID if the UL NAS TRANSPORT message transports a PDU SESSION ESTABLISHMENT REQUEST message upon receiving the PDU SESSION MODIFICATION COMMAND message with the 5GSM cause IE set to #39"reactivation requested" and the Payload container type field of the payload container entry is set to "N1 SM information";

shall include Request type when the PDU session ID IE is included and the Payload container IE contains the PDU SESSION ESTABLISHMENT REQUEST message or the PDU SESSION MODIFICATION REQUEST and the Payload container type field of the payload container entry is set to "N1 SM information";

may include S-NSSAI when the Request type IE is set to "initial request" or "existing PDU session" and the Payload container type field of the payload container entry is set to "N1 SM information"

may include DNN when the Request type IE is set to "initial request" or "existing PDU session" and the Payload container type field of the payload container entry is set to "N1 SM information"; and may include Additional information IE when the Payload container type field of the payload container entry is set to "LTE Positioning Protocol (LPP) message container"; and ii) format the payload container entry as specified in cases a) to e) of section 2A above.

By way of example and with reference to FIG. 1a, in an embodiment in which the apparatus comprises the user equipment, the apparatus is caused to generate a payload container information element comprising two or more payloads by bundling the two or more payloads generated by different applications of the user equipment, such as by the SM layer, the LCS layer, the SMS layer, the USIM, etc., along with routing or session information into the payload container information element. The apparatus is also caused to encapsulate the payload container information element comprising the two or more payload entries in a non-access stratum message. Further, the apparatus of this example embodiment is caused to send the payload container information element by causing the non-access stratum message encapsulating the payload container information element to be sent to a mobility management function, such as an AMF.

C. UE-Initiated NAS Transport of Messages Accepted by the Network

Upon reception of a UL NAS TRANSPORT message, if the Payload container type IE is set to:

a) "N1 SM information", the AMF looks up a PDU session routing context for:

1) the UE and the PDU session ID IE in case the Old PDU session ID IE is not included other than the instance in which the Old PDU session ID IE is not included in the uplink (UL) NAS TRANSPORT message and the AMF has received a reallocation requested indication from the SMF, in which instance the AMF needs to ignore the reallocation requested indication, and:

i) if the AMF has a PDU session routing context for the PDU session ID and the UE, and the Request type IE is either not included or is included but set to other value than "initial request", "existing PDU session", "initial emergency request" and "existing emergency PDU session", the AMF shall forward the 5GSM message, and the PDU session ID IE towards the SMF identified by the SMF ID of the PDU session routing context;

ii) if the AMF has a PDU session routing context for the PDU session ID and the UE, the PDU session routing context indicates that the PDU session is not an emergency PDU session, the Request type IE is included and is set to "existing PDU session", and the S-NSSAI associated with the PDU session identified by the PDU session ID is allowed for the target access type, the AMF shall forward the 5GSM message, the PDU session ID, the S-NSSAI, the mapped configured S-NSSAI from the configured NSSAI for the HPLMN (if available in roaming scenarios), the DNN (if received) and the request type towards the SMF identified by the SMF ID of the PDU session routing context;

iii) if the AMF does not have a PDU session routing context for the PDU session ID and the UE, and the Request type IE is included and is set to "initial request":

A) the AMF shall select an SMF with the following handlings:

If the S-NSSAI IE is not included and the user's subscription context obtained from UDM:
contains one default S-NSSAI, the AMF shall use the default S-NSSAI as the S-NSSAI;
contains two or more default S-NSSAIs, the AMF shall use one of the default S-NSSAIs selected by operator policy as the S-NSSAI; and
does not contain a default S-NSSAI, the AMF shall use an S-NSSAI selected based on operator policy as the S-NSSAI.

If the DNN IE is not included, and the user's subscription context obtained from UDM:
contains the default DNN for the S-NSSAI, the AMF shall use the default DNN as the DNN; and
does not contain the default DNN for the S-NSSAI, the AMF shall use a locally configured DNN as the DNN; and If the DNN is a LADN DNN, the AMF shall determine the UE presence in the local area data network (LADN) service area; and B) if the SMF selection is successful:
the AMF shall store a PDU session routing context for the PDU session ID and the UE, shall set the SMF ID in the stored PDU session routing context to the SMF ID corresponding to the DNN in the user's subscription context obtained from the UDM; and
the AMF shall forward the 5GSM message, the PDU session ID, the S-NSSAI, the mapped configured S-NSSAI from the configured NSSAI for the HPLMN (if available in roaming scenarios), the DNN, the request type and UE presence in LADN service area (if DNN received corresponds to an LADN DNN) towards the SMF identified by the SMF ID of the PDU session routing context;

iv) if the AMF does not have a PDU session routing context for the PDU session ID and the UE, the Request type IE is included and is set to "existing PDU session", and the user's subscription context obtained from the UDM contains an SMF ID associated with:

A) the PDU session ID matching the PDU session ID received from the UE, if any; or B) the DNN matching the DNN received from the UE, otherwise;

such that the SMF ID includes a PLMN identity corresponding to the UE's HPLMN or the current PLMN, then:

A) the AMF shall store a PDU session routing context for the PDU session ID and the UE, shall set the SMF ID in the stored PDU session routing context to the SMF ID contained in the user's subscription context obtained from the UDM; and B) the AMF shall forward the 5GSM message, the PDU session ID, the S-NSSAI, the mapped configured S-NS- SAI from the configured NSSAI for the HPLMN (if available in roaming scenarios), the DNN (if received) and the request type towards the SMF identified by the SMF ID of the PDU session routing context;

v) if the AMF does not have a PDU session routing context for the PDU session ID and the UE, the Request type IE is included and is set to "initial emergency request", and the AMF does not have a PDU session routing context for another PDU session ID of the UE indicating that the PDU session is an emergency PDU session:

A) the AMF shall select an SMF. The AMF shall use the emergency DNN from the AMF emergency configuration data as the DNN, if configured. The AMF shall derive the SMF from the emergency DNN or use the statically configured SMF from the AMF emergency configuration data, if configured; and B) if the SMF selection is successful:
  the AMF shall store a PDU session routing context for the PDU session ID and the UE, shall set the SMF ID in the stored PDU session routing context to the SMF ID of the selected SMF, and shall store an indication that the PDU session is an emergency PDU session in the stored PDU session routing context; and
  the AMF shall forward the 5GSM message, the PDU session ID, the S-NSSAI (if configured in the AMF emergency configuration data), the DNN (if configured in the AMF emergency configuration data), and the request type towards the SMF identified by the SMF ID of the PDU session routing context; and vi) if the AMF does not have a PDU session routing context for the PDU session ID and the UE, the Request type IE is included and is set to "initial emergency request", and the AMF has a PDU session routing context indicating that the PDU session is an emergency PDU session for another PDU session ID of the UE:

A) the AMF shall store a PDU session routing context for the PDU session ID and the UE and shall set the SMF ID in the stored PDU session routing context to the SMF ID of the PDU session routing context for the other PDU session ID of the UE; and B) the AMF shall forward the 5GSM message, the PDU session ID, the S-NSSAI (if configured in the AMF emergency configuration data), the DNN (if configured in the AMF emergency configuration data) and the request type towards the SMF identified by the SMF ID of the PDU session routing context; or vii) if the AMF has a PDU session routing context for the PDU session ID and the UE, the PDU session routing context indicates that the PDU session is an emergency PDU session, and the Request type IE is included and is set to "existing emergency PDU session", the AMF shall forward the 5GSM message, the PDU session ID, the S-NSSAI (if configured in the AMF emergency configuration data), the DNN (if configured in the AMF emergency configuration data), and the request type towards the SMF identified by the SMF ID of the PDU session routing context; and viii) if the AMF does not have a PDU session routing context for the PDU session ID and the UE, the Request type IE is included and is set to "existing emergency PDU session", and the user's subscription context obtained from the UDM contains an SMF ID for the DNN matching the DNN received from the UE such that the SMF ID includes a PLMN identity corresponding to the current PLMN, then:

A) the AMF shall store a PDU session routing context for the PDU session ID and the UE, shall set the SMF ID in the stored PDU session routing context to the SMF ID contained in the user's subscription context obtained from the UDM; and B) the AMF shall forward the 5GSM message, the PDU session ID, the S-NSSAI (if configured in the AMF emergency configuration data), the DNN (if configured in the AMF emergency configuration data), and the request type towards the SMF identified by the SMF ID of the PDU session routing context; or 2) the UE and the Old PDU session ID IE in case the Old PDU session ID IE is included, and:

i) the AMF has a PDU session routing context for the old PDU session ID and the UE and does not have a PDU session routing context for the PDU session ID and the UE, the Request type IE is included and is set to "initial request", and the AMF received a reallocation requested indication from the SMF indicating that the SMF is to be reused, the AMF shall store a PDU session routing context for the PDU session ID and the UE, set the SMF ID in the stored PDU session routing context to the SMF ID of the PDU session routing context for the old PDU session ID and the UE. If the DNN is a LADN DNN, the AMF shall determine the UE presence in the LADN service area. The AMF shall forward the 5GSM message, the PDU session ID, the old PDU session ID, the S-NSSAI (if received), the mapped configured S-NSSAI from the configured NSSAI for the HPLMN (if available in roaming scenarios), the DNN, the request type and UE presence in LADN service area (if DNN received corresponds to an LADN DNN) towards the SMF identified by the SMF ID of the PDU session routing context;

ii) the AMF has a PDU session routing context for the old PDU session ID and the UE and does not have a PDU session routing context for the PDU session ID and the UE, the Request type IE is included and is set to "initial request", and the AMF received a reallocation requested indication from the SMF indicating that the SMF is to be reallocated:

A) the AMF shall select an SMF with the following handling;
  If the S-NSSAI IE is not included and the user's subscription context obtained from UDM:
    contains one default S-NSSAI, the AMF shall use the default S-NSSAI as the S-NSSAI;
    contains two or more default S-NSSAIs, the AMF shall use one of the default S-NSSAIs selected by operator policy as the S-NSSAI; and
    does not contain a default S-NSSAI, the AMF shall use an S-NSSAI selected based on operator policy as the S-NSSAI.
  If the DNN is a LADN DNN, the AMF shall determine the UE presence in the LADN service area; and B) if the SMF selection is successful:
  the AMF shall store a PDU session routing context for the PDU session ID and the UE and set the SMF ID of the PDU session routing context to the SMF ID of the selected SMF; and
  the AMF shall forward the 5GSM message, the PDU session ID, the old PDU session ID, the S-NSSAI, the mapped configured S-NSSAI from the configured NSSAI for the HPLMN (if available in roaming scenarios), the DNN, the request type and UE presence in the LADN service area (if DNN received corresponds to an LADN DNN) towards the SMF identified by the SMF ID of the PDU session routing context for the PDU session ID and the UE;
b) "SMS", the AMF shall forward the content of the Payload container IE to the SMSF associated with the UE;
c) "LTE Positioning Protocol (LPP) message container", the AMF shall forward the content of the Payload container IE to the location management function (LMF) associated with the routing information included in the Additional information IE of the UL NAS TRANSPORT message;
d) "SOR transparent container", the AMF shall forward the content of the Payload container IE to the UDM;
e) "UE policy container", the AMF shall forward the content of the Payload container IE to the PCF; and
x) "Multiple payloads", the AMF shall first decode the content of the Payload container IE into individual payloads as specified in FIGS. 6-8. For each payload container entry, the AMF shall:
  i) decode optional IEs in the payload container entry and payload container field according to FIG. 7; and
  ii) apply the same handling as specified in cases (a)-(e) above according to the payload container type within each payload container entry.

By way of example and with reference to FIG. 1a, in an embodiment in which the apparatus comprises a mobility management function (MMF), such as an AMF, the apparatus is caused to receive two or more messages containing payloads that are generated by one or more network functions, e.g., SMF, SMSF, PCF, LMF, GMLC, UDM, etc., and provided to the MMF via an MMF service based interface, such as to the AMF via an AMF service based interface and to extract the payloads along from the two or more received messages from the one or more network functions. In this example embodiment, the apparatus is caused to generate the payload container information element by bundling the two or more extracted payloads along with routing or session information into the payload container information element and the apparatus is also caused to encapsulate the payload container information element comprising the two or more payload entries into a non-access stratum message. In this example embodiment, the apparatus is further caused to send the payload container information element by causing the payload container information element to be sent to the user equipment as part of the non-access stratum transport procedure.

3. Network-Initiated NAS Transport Procedure
A. General

Figure 1B:
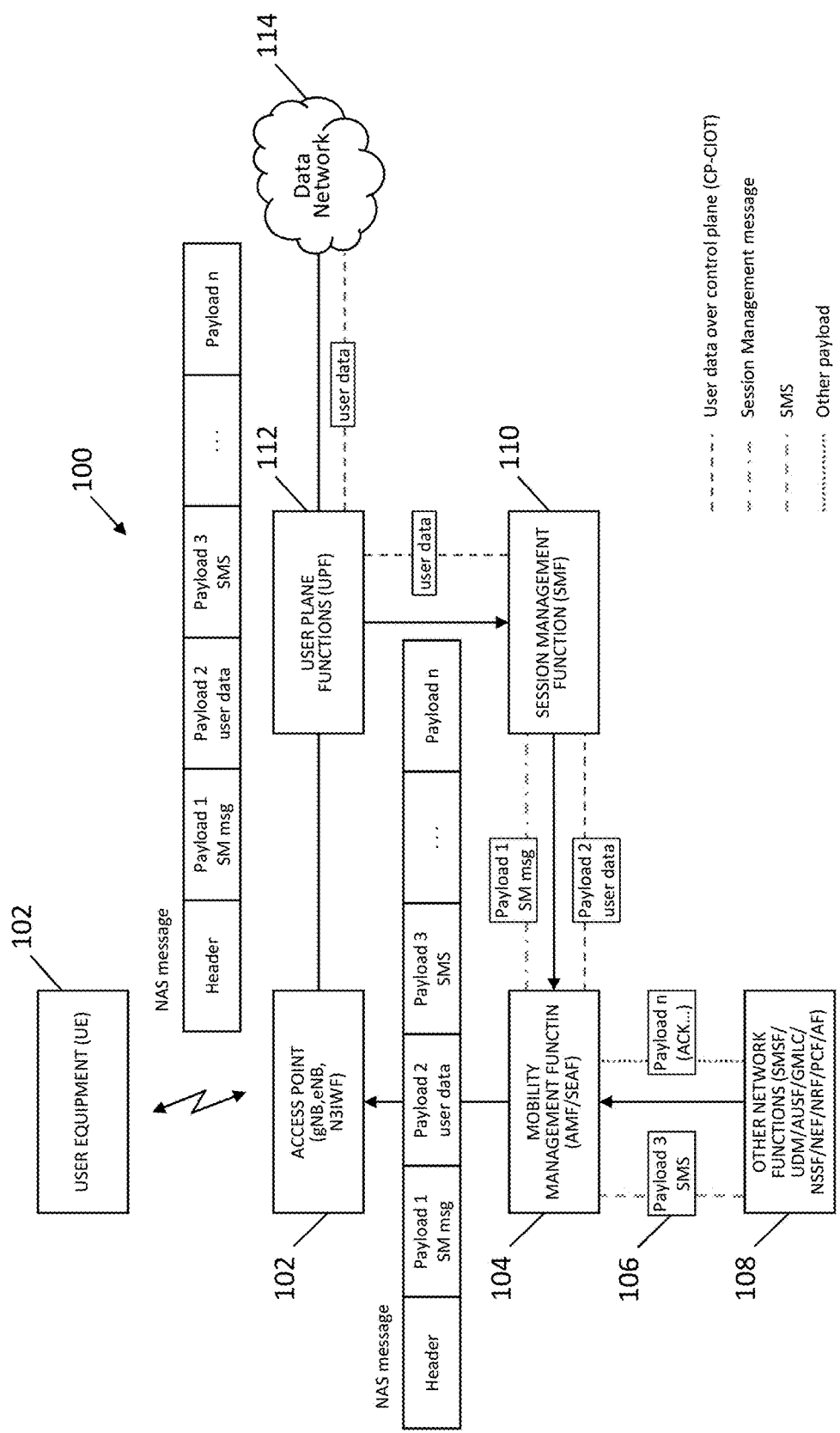
FIG. 1B illustrates that payloads from different network functions are bundled into a NAS message with multiple payloads and sent to the user equipment.

The purpose of the network-initiated NAS transport procedure is to provide a transport of:
a) a single 5GSM message;
b) SMS;
c) an LPP message;
d) an SOR transparent container;
e) a single uplink 5GSM message which was not forwarded due to routing failure;
f) a single uplink 5GSM message which was not forwarded due to congestion control;
g) a UE policy container;
h) a single uplink 5GSM message which was not forwarded, because the public land mobile network's (PLMN')s maximum number of PDU sessions has been reached; or
y) multiple of the above types.

from the AMF to the UE in a 5GMM message. Reference is also made to FIG. 1b which depicts payloads from different network functions being bundled into a NAS message and sent to the UE. The resulting NAS message has a header and multiple payloads, namely, payload 1 in the form of a SM message, payload 2 in the form of user data, payload 3 in the form of an SMS message, . . . payload n. As shown in FIG. 1b, the multiple payloads are generated by different network functions, such as the data network with respect to the user data, the SMF with respect to the SM message, the SMSF with respect to the SMS message and the like. The multiple payloads are bundled into a single NAS message and transmitted to the UE.

B. Network-Initiated NAS Transport Procedure Initiation

Figure 4:
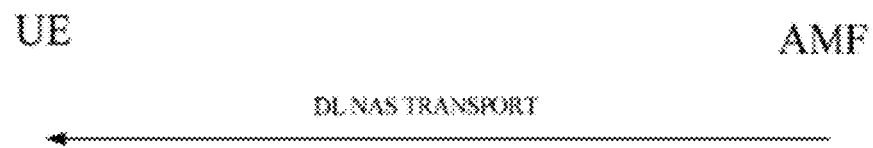
FIG. 4 illustrates a network-initiated transport procedure in an illustrative embodiment.
Figure 5:
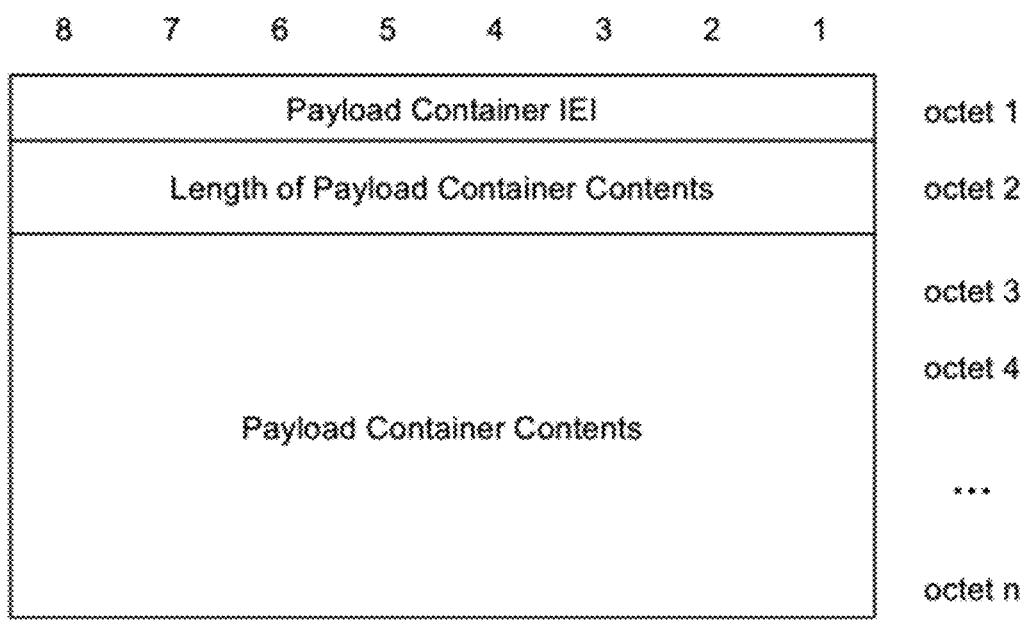
FIG. 5 illustrates a payload container information element in an illustrative embodiment.

In connected mode, the AMF initiates the NAS transport procedure by sending the downlink (DL) NAS TRANSPORT message, as shown in FIG. 4.

In case a) in section 3A, i.e. upon reception from an SMF of a 5GSM message without an N1 SM delivery skip allowed indication for a UE or a 5GSM message with an N1 SM delivery skip allowed indication for a UE in the 5GMM-CONNECTED mode, the AMF shall:
  a) include the PDU session information (PDU session ID) in the PDU session ID IE;
  b) set the Payload container type IE to "N1 SM information"; and
  c) set the Payload container IE to the 5GSM message.

In case b) in section 3A, i.e. upon reception from a short message service function (SMSF) of an SMS payload, the AMF shall:
  a) set the Payload container type IE to "SMS";
  b) set the Payload container IE to the SMS payload; and
  c) select the access type to deliver the DL NAS TRANSPORT message as follows in case the access type selection is required:
    1) if the UE to receive the DL NAS TRANSPORT message is registered to the network via both 3GPP access and non-3GPP access, the $5^{th}$ generation mobility management (5GMM) context of the UE indicates that SMS over NAS is allowed, the UE is in mobile initiated connection only (MICO) mode, and the UE is in 5GMM-IDLE mode for 3GPP access and in 5GMM-CONNECTED mode for non-3GPP access, then the AMF selects non-3GPP access. Otherwise, the AMF selects either 3GPP access or non-3GPP access.
      If the delivery of the DL NAS TRANSPORT message over 3GPP access has failed, the AMF may re-send the DL NAS TRANSPORT message over the non-3GPP access.
      If the delivery of the DL NAS TRANSPORT message over non-3GPP access has failed, the AMF may re-send the DL NAS TRANSPORT message over the 3GPP access; and
    2) otherwise, the AMF selects 3GPP access.
In this case, the AMF selects an access type between 3GPP access and non-3GPP access based on operator policy.

In case c) in section 3A, i.e. upon reception from an LMF of an LPP message payload, the AMF shall:
  a) set the Payload container type IE to "LTE Positioning Protocol (LPP) message container";
  b) set the Payload container IE to the LPP message payload received from the LMF; and
  c) set the Additional information IE to the routing information associated with the LMF from which the LPP message was received.

In case d) in section 3A, i.e. upon reception of a steering of roaming information from the UDM to be forwarded to the UE, the AMF shall:
  a) set the Payload container type IE to "SOR transparent container"; and b) set the Payload container IE to the steering of roaming information received from the UDM.

In case e) in section 3A, i.e. upon sending a single uplink 5GSM message which was not forwarded due to routing failure, the AMF shall:
  a) include the PDU session ID in the PDU session ID IE;
  b) set the Payload container type IE to "N1 SM information";
  c) set the Payload container IE to the 5GSM message which was not forwarded; and
  d) set the 5GMM cause IE to the 5GMM cause #90 "payload was not forwarded" or 5GMM cause #91 "DNN not supported with no slice or DNN not supported in specific slice". The AMF sets the 5GMM cause IE to the 5GMM cause #91 "DNN not supported with no slice or DNN not supported in specific slice", if the 5GSM message could not be forwarded since SMF selection fails due to the DNN not being supported in the slice identified by the S-NSSAI used by the AMF.

In case f) in section 3A, i.e. upon sending a single uplink 5GSM message which was not forwarded due to congestion control, the AMF shall:
  a) include the PDU session ID in the PDU session ID IE;
  b) set the Payload container type IE to "N1 SM information";
  c) set the Payload container IE to the 5GSM message which was not forwarded;
  d) set the 5GMM cause IE to the 5GMM cause #22 "Congestion", the 5GMM cause #67 "insufficient resources for specific slice and DNN" or the 5GMM cause #69 "insufficient resources for specific slice"; and
  e) include the Back-off timer value IE.

In case g) in section 3A, i.e. upon reception of a UE policy container from the PCF to be forwarded to the UE, the AMF shall:
  a) set the Payload container type IE to "UE policy container"; and
  b) set the Payload container IE to the UE policy container received from the PCF.

In case h) in section 3A, i.e. upon sending a single uplink 5GSM message which was not forwarded, because the PLMN's maximum number of PDU sessions has been reached, the AMF shall:
  a) include the PDU session ID in the PDU session ID IE;
  b) set the Payload container type IE to "N1 SM information";
  c) set the Payload container IE to the 5GSM message which was not forwarded; and
  d) set the 5GMM cause IE to the 5GMM cause #65 "maximum number of PDU sessions reached".

In case y) in section 3A, the AMF shall:
  a) set the Payload container type IE to "Multiple payloads";
  b) set the contents of the Payload container IE as specified in FIGS. 6-8. For each payload container entry, the AMF shall:
    i) include the optional IEs in the payload container entry along with payload container field as shown in FIG. 7 according to the following inclusion conditions:
      include PDU session ID IE when the payload container type field of the payload container entry is set to "N1 SM information";
      include Additional information IE when the payload container type field of the payload container entry is set to "LTE Positioning Protocol (LPP) message container";
      include 5GMM cause when the payload container field of the payload container entry contains an uplink payload which was not forwarded and the payload container type field of the payload container entry is set to "N1 SM information"; and
      include Back-off timer value when the payload container field of the payload container entry contains an uplink 5GSM message which was not forwarded due to DNN based congestion control, S-NSSAI and DNN based congestion control or S-NSSAI only based congestion control and the payload container type field of the payload container entry is set to "N1 SM information"; and
    ii) format the payload container field of the payload container entry as specified in cases a) to h) above.

By way of example and with reference to FIG. 1b, in an embodiment in which the apparatus comprises the user equipment, the apparatus is caused to receive the payload container information element by receiving a non-access stratum (NAS) message with the payload container information element containing the two or more payloads. The apparatus is also caused to decode the two or more payload entries by extracting the two or more payloads from the received NAS message. In this example embodiment, the apparatus is further caused to determine a destination application in the user equipment for a respective payload based upon the identification of the payload container type and information associated with the respective payload in the corresponding payload entry and to cause each respective payload is sent to a different application in the user equipment, such as applicants of the SM layer, the LCS entity, the SMS layer, the USIM, etc.

C. Network-Initiated NAS Transport of Messages

Upon reception of a DL NAS TRANSPORT message, if the Payload container type IE is set to:
  a) "N1 SM information" and the 5GMM cause IE is not included in the DL NAS TRANSPORT message, the 5GSM message in the Payload container IE and the PDU session ID are handled in the 5GSM procedures;
  b) "SMS", the UE shall forward the content of the Payload container IE to the SMS stack entity;
  c) "LTE Positioning Protocol (LPP) message container", the UE shall forward the content of the Payload container IE and the routing information included in the Additional information IE to the upper layer location services application;
  d) "SOR transparent container" and if the payload container IE:
    1) successfully passes the integrity check, and indicates a list of preferred PLMN/access technology combinations is provided and the list type indicates:
      i) "PLMN ID and access technology list", then the ME shall replace the highest priority entries in the "Operator Controlled PLMN Selector with Access Technology" list stored in the ME and shall proceed with the behaviour as specified in 3GPP TS 23.122 [5] annex C; or
      ii) "secure packet", then the ME shall behave as if a SMS is received with protocol identifier set to SIM data download, data coding scheme set to class 2 message and SMS payload as secure packet contents of SOR transparent container IE. The SMS payload is forwarded to UICC as specified in 3GPP TS 23.040 [4A] and the ME shall proceed with the behaviour as specified in 3GPP TS 23.122 [5] annex C; or
2) does not successfully pass the integrity check (see 3GPP TS 33.501 [24]) then the UE shall proceed with the behaviour as specified in 3GPP TS 23.122 [5] annex C.
e) "N1 SM information" and the 5GMM cause IE is set to the 5GMM cause #90 "payload was not forwarded" in the DL NAS TRANSPORT message, the UE passes to the 5GSM sublayer an indication that the 5GSM message was not forwarded due to routing failure along with the 5GSM message from the Payload container IE of the DL NAS TRANSPORT message;
f) "N1 SM information" and the 5GMM cause IE is set to the 5GMM cause #91 "DNN not supported with no slice or DNN not supported in specific slice" in the DL NAS TRANSPORT message, the UE passes to the 5GSM sublayer an indication that the 5GSM message was not forwarded due to the DNN not being supported in a slice along with the 5GSM message from the Payload container IE of the DL NAS TRANSPORT message;
g) "N1 SM information" and:
the 5GMM cause IE is set to the 5GMM cause #22 "Congestion", the UE passes to the 5GSM sublayer an indication that the 5GSM message was not forwarded due to DNN based congestion control along with the 5GSM message from the Payload container IE of the DL NAS TRANSPORT message, and the time value from the Back-off timer value IE;
the 5GMM cause IE is set to the 5GMM cause #65 "maximum number of PDU sessions reached", the UE passes to the 5GSM sublayer an indication that the 5GSM message was not forwarded because the PLMN's maximum number of PDU sessions has been reached, along with the 5GSM message from the Payload container IE of the DL NAS TRANSPORT message;
the 5GMM cause IE is set to the 5GMM cause #67 "insufficient resources for specific slice and DNN", the UE passes to the 5GSM sublayer an indication that the 5GSM message was not forwarded due to S-NSSAI and DNN based congestion control along with the 5GSM message from the Payload container IE of the DL NAS TRANSPORT message, and the time value from the Back-off timer value IE; or
the 5GMM cause IE is set to the 5GMM cause #69 "insufficient resources for specific slice", the UE passes to the 5GSM sublayer an indication that the 5GSM message was not forwarded due to S-NSSAI only based congestion control along with the 5GSM message from the Payload container IE of the DL NAS TRANSPORT message, and the time value from the Back-off timer value IE; and
h) "UE policy container", the UE policy container in the Payload container IE is handled in the UE policy delivery procedures;
y) "Multiple payloads", the UE shall first decode the content of the Payload container IE into individual payload container entries as specified in FIGS. 6-8. For each payload container entry, the UE shall:
i) decode optional IEs in the payload container entry and payload container field according to FIG. 7; and
ii) apply the same handling as specified in cases above according to the payload container type field within each payload container entry.

By way of example and with reference to FIG. 1b, in an embodiment in which the apparatus comprises a mobility management function (MMF), such as an AMF, the apparatus is caused to receive the payload container information element by receiving a non-access stratum (NAS) message with the payload container information element comprising the two or more payloads. The apparatus is also caused to decode the two or more payload entries by extracting the two or more payloads from the received NAS message. In this example embodiment, the apparatus is further caused to determine a destination network function for a respective payload based upon the identification of the payload container type and information associated with the respective payload in the corresponding payload entry, encapsulate the respective payloads into separate messages and cause the separate messages to be sent to corresponding destination network functions, e.g., SMF, SMSF, PCF, LMF, GMLC, UDM, etc.

4. Payload Container

The purpose of the Payload container information element is to transport one or multiple payloads. If multiple payloads are transported, the associated information of each payload are also transported together with the payload.

The Payload container information element is coded as shown in FIGS. 5-8 and as described below.

The Payload container is a type 6 information element with a minimum length of 4 octets and a maximum length of 65538 octets.

The Payload Container Contents (Octet 4 to Octet n); Max Value of 65535 Octets

If the payload container type is a SOR transparent container and is included in the DL NAS TRANSPORT message, the payload container contents are coded the same way as the contents of the SOR transparent container IE for SOR data type with value "0" except that the first three octets are not included.

If the payload container type is a SOR transparent container and is included in the UL NAS TRANSPORT message, the payload container contents are coded the same way as the contents of the SOR transparent container IE for SOR data type with value "1" except that the first three octets are not included.

If the payload container type is multiple payloads, the number of entries field represents the total number of payload container entries, and the payload container contents field is coded as a list of payload container entry according to FIG. 6, with each payload container entry being coded according to FIGS. 7 and 8.

The coding of Payload container contents is dependent on the particular application.

Payload Container Entry

For each Payload container entry, the Payload container type represents the payload type and the number of optional IEs field represents the total number of optional IEs associated with the payload in Payload container entry.

Optional IE

Each optional IE is coded according to FIG. 8.

Type of Optional IE (Octet xi+2)

This field contains the IEI of the optional IE entry and is 1 octet in length.

The following table lists IEI and optional IE names:

| IEI | Optional IE name |
|---|---|
| 70 | PDU session ID |
| 24 | Additional information |
| 58 | 5GMM cause |
| 37 | Back-off timer value |
| 61 | Old PDU session ID |
| 8- | Request type |
| 22 | S-NSSAI |
| 25 | DNN |

The following optional IEs can be included in the payload container entry along with payload container field as shown in FIG. 7 during network-initiated NAS transport procedure according to the following inclusion conditions:

PDU Session ID

The AMF shall include this IE when the Payload container type IE of the payload container entry is set to "N1 SM information".

Additional Information

The AMF may include this IE when the Payload container type IE of the payload container entry is set to "LTE Positioning Protocol (LPP) message container".

5GMM Cause

The AMF shall include this IE when the Payload container IE of the payload container entry contains an uplink payload which was not forwarded.

Back-Off Timer Value

The AMF shall include this IE when the Payload container IE of the payload container entry contains an uplink 5GSM message which was not forwarded due to DNN based congestion control, S-NSSAI and DNN based congestion control or S-NSSAI only based congestion control.

The following optional IEs can be included in the payload container entry along with payload container IE as shown in FIG. 7 during UE-initiated NAS transport procedure according to the following inclusion conditions:

PDU Session ID

The UE shall include this IE when the Payload container type IE is set to "N1 SM information".

Old PDU Session ID

The UE shall include this IE if the UL NAS TRANSPORT message transports a PDU SESSION ESTABLISHMENT REQUEST message upon receiving the PDU SESSION MODIFICATION COMMAND message with the 5GSM cause IE set to #39 "reactivation requested".

Request Type

The UE shall include this IE when the PDU session ID IE is included and the Payload container IE contains the PDU SESSION ESTABLISHMENT REQUEST message or the PDU SESSION MODIFICATION REQUEST.

S-NSSAI

The UE may include this IE when the Request type IE is set to "initial request" or "existing PDU session".

DNN

The UE may include this IE when the Request type IE is set to "initial request" or "existing PDU session".

Additional Information

The UE may include this IE when the Payload container type IE is set to "LTE Positioning Protocol (LPP) message container".

5. Payload Container Type

The purpose of the Payload container type information element indicates type of payload included in the payload container information element.

Figure 9:
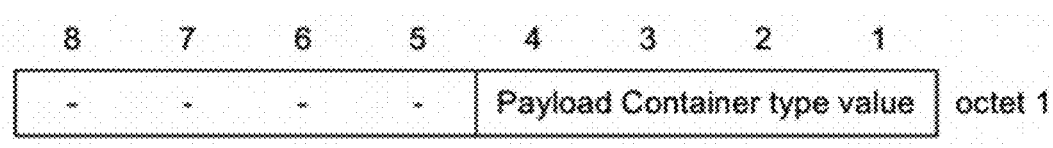
FIG. 9 illustrates a payload container information element in an illustrative embodiment.

The Payload container information element is coded as shown in FIG. 9.

The Payload container is a type 1 information element with a length of half octet.

The Payload container type value (octet 1, bit 1 to bit 4) is shown in the following table:

| Bits | | | | |
|---|---|---|---|---|
| 4 | 3 | 2 | 1 | |
| 0 | 0 | 0 | 1 | N1 SM information |
| 0 | 0 | 1 | 0 | SMS |
| 0 | 0 | 1 | 1 | LTE Positioning Protocol (LPP) message container |
| 0 | 1 | 0 | 0 | SOR transparent container |
| 0 | 1 | 0 | 1 | UE policy container |
| | | | | . . . |
| 1 | 1 | 1 | 1 | Multiple payloads |

All other values are reserved. The value "Multiple payloads" is used when the Payload container contents in FIG. 5 contains multiple payloads formatted as shown in FIG. 6.

The particular processing operations and other system functionality described in conjunction with the diagrams herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

The invention claimed is:

1. An apparatus comprising:
at least one processor; and
a memory storing one or more software programs executed by the at least one processor to cause the apparatus to:
generate a payload container information element and a payload container type information element, wherein the payload container information element comprises two or more payload entries,
wherein the payload container information element comprises payload container contents, the payload container contents comprising an indication of a number of entries and a plurality of payload container entries including the two or more payload entries, and
wherein the payload container type information element comprises an identification of a payload type, the identification of the payload type comprising an identification of multiple payloads to designate inclusion of the two or more payload entries in the payload container information element; and cause the payload container information element and the payload container type information element to be sent as part of a non-access stratum transport procedure to least one network element in a communication system.

2. The apparatus of claim 1, wherein the apparatus comprises a user equipment.

3. The apparatus of claim 2, wherein the apparatus is caused to generate the payload container information element comprising the two or more payloads by bundling the two or more payloads generated by different applications along with routing or session information into the payload container information element, wherein the apparatus is also caused to encapsulate the payload container information element comprising the two or more payload entries in a non-access stratum message, and wherein the apparatus is caused to send the payload container information element by causing the non-access stratum message encapsulating the payload container information element to be sent to a mobility management function.

4. The apparatus of claim 1, wherein a respective one of the plurality of payload container entries comprises an indication of a length of the respective payload container entry, an indication of a payload container type and payload container entry contents of the respective payload container entry.

5. The apparatus of claim 4, wherein each of at least a portion of the two or more payload entries comprises information associated with the payload container entry contents corresponding to the respective payload entry.

6. The apparatus of claim 5, wherein the information associated with the payload container entry contents corresponding to the respective payload entry comprises session information specific to the payload entry.

7. The apparatus of claim 6, wherein each of the two or more payload entries comprises one of the following types: a Session management message, a short message service (SMS) message, a location positioning protocol (LPP) message, Steering of roaming information, user equipment (UE) policy information, UE parameters, Location service message or cellular internet of things (CIoT) user data.

8. The apparatus of claim 6, wherein the session information specific to the payload entry comprises one of the following: a Session management message request type, a packet data unit (PDU) session ID, a Data network name or Network Slice Selection Assistance Information (S-NSSAI).

9. A method comprising:
generating a payload container information element and a payload container type information element, wherein the payload container information element comprises two or more payload entries,
wherein the payload container information element comprises payload container contents, and wherein the payload container contents comprise an indication of a number of entries and a plurality of payload container entries including the two or more payload entries, and
wherein the payload container type information element comprises an identification of a payload type, the identification of the payload type comprising an identification of multiple payloads to designate inclusion of the two or more payload entries in the payload container information element; and
causing the payload container information element and the payload container type information element to be sent as part of a non-access stratum transport procedure to at least one network element of a communication system.

10. The method of claim 9, wherein the method is performed by a user equipment.

11. The method of claim 10, wherein generating the payload container information element comprising the two or more payloads comprises bundling the two or more payloads generated by different applications along with routing or session information into the payload container information element, wherein the method further comprises encapsulating the payload container information element comprising the two or more payload entries in a non-access stratum message, and wherein causing the payload container information element to be sent comprises causing the non-access stratum message encapsulating the payload container information element to be sent to a mobility management function.

12. The method of claim 9, wherein a respective one of the plurality of payload container entries comprises an indication of a length of the respective payload container entry, an indication of a payload container type and payload container entry contents of the respective payload container entry.

13. The method of claim 12, wherein each of at least a portion of the two or more payload entries comprises information associated with the payload container entry contents corresponding to the respective payload entry.

14. The method of claim 13, wherein the information associated with the payload container entry contents corresponding to the respective payload entry comprises session information specific to the payload entry.

15. An apparatus comprising:
at least one processor; and
a memory storing one or more software programs executed by the at least one processor to cause the apparatus to:
receive a payload container information element and a payload container type information element, wherein the payload container information element comprises two or more payload entries as part of a non-access stratum transport procedure from at least one network element of a communication system,
wherein the payload container information element comprises payload container contents, the payload container contents comprising an indication of a number of entries and a plurality of payload container entries including the two or more payload entries, and
wherein the payload container type information element comprises an identification of a payload type, the identification of the payload type comprising an identification of multiple payloads to designate inclusion of the two or more payload entries in the payload container information element; and
decode the two or more payload entries of the payload container information element into two or more individual payloads.

16. The apparatus of claim 15, wherein the apparatus comprises a user equipment.

17. The apparatus of claim 16, wherein the apparatus is caused to receive the payload container information element and the payload container type information element by receiving a non-access stratum (NAS) message with the payload container information element containing the two or more payloads, wherein the apparatus is caused to decode the two or more payload entries by extracting the two or more payloads from the received NAS message, and wherein the apparatus is further caused to:
determine a destination application in the user equipment for a respective payload based upon the identification of the payload type and information associated with the respective payload in the corresponding payload entry; and cause each respective payload is sent to a different application in the user equipment.

18. The apparatus of claim 15, wherein a respective one of the plurality of payload container entries comprises an indication of a length of the respective payload container entry, an indication of a payload container type and payload container entry contents of the respective payload container entry.

19. The apparatus of claim 18, wherein each of at least a portion of the two or more payload entries comprises information associated with the payload container entry contents corresponding to the respective payload entry.

20. The apparatus of claim 19, wherein the information associated with the payload container entry contents corresponding to the respective payload entry comprises session information specific to the payload entry.

* * * * *